United States Patent
Morris et al.

(10) Patent No.: US 7,039,873 B2
(45) Date of Patent: May 2, 2006

(54) USER-DEFINED TEMPLATES FOR AUTOMATIC IMAGE NAMING

(75) Inventors: Robert P. Morris, Raleigh, NC (US); Patricia Scardino, Apex, NC (US)

(73) Assignee: FlashPoint Technology, Inc., Raleigh, NC (US)

( * ) Notice: Subject to any disclaimer, the term of this patent is extended or adjusted under 35 U.S.C. 154(b) by 100 days.

(21) Appl. No.: 10/436,561

(22) Filed: May 12, 2003

(65) Prior Publication Data

US 2004/0230966 A1    Nov. 18, 2004

(51) Int. Cl.
*G09G 5/00*    (2006.01)
(52) U.S. Cl. ........................ 715/748; 715/745
(58) Field of Classification Search ............... 345/733, 345/738, 740, 747, 748
See application file for complete search history.

(56) References Cited

U.S. PATENT DOCUMENTS

| | | | |
|---|---|---|---|
| 6,667,816 B1 * | 12/2003 | Van Buren et al. | 358/3.13 |
| 2002/0078069 A1 * | 6/2002 | Moore | 707/200 |
| 2002/0198023 A1 * | 12/2002 | Ido | 455/557 |

* cited by examiner

*Primary Examiner*—Kristine Kincaid
*Assistant Examiner*—Thanh Vu

(57) ABSTRACT

A method and system for automatically generating names for files uploaded from a computer to a server is disclosed. Aspects of the present invention include allowing a user to define a file-naming template using information available from a variety of sources including, the uploaded files, an application environment of the server, and an operating environment of the computer. Names are then automatically generated for each file when files are uploaded based on the template pattern.

26 Claims, 3 Drawing Sheets

USER-DEFINED TEMPLATES FOR AUTOMATIC IMAGE NAMING

FIELD OF THE INVENTION

The present invention relates to digital images, and more particularly, to a method for automatically naming uploaded images to a photo-sharing site using user-defined naming templates.

BACKGROUND OF THE INVENTION

Digital images captured by a digital camera or scanner are typically named by numbering the images sequentially starting with some initial number. The images are then typically saved on a user's computer for storage, where they are identified by their assigned numbers. Most imaging software allows the user to change the assigned names, but many users do not take the time to do so. If their image collection is large enough, they probably have organized the files into different folders on their PC to help them find images when they want them.

User's are increasingly beginning to upload their digital images to online photosharing sites where the images are stored in online albums for sharing with others. Once on the site, the images are typically displayed sequentially based on an image number or the time and date that the images were captured. The images are also typically displayed as a list of names, or as thumbnail images in which a small resolution image is displayed above the image names.

The nondescript image names are often inconvenient for users. For the owner of the images, the numeric image names can make it difficult for the user to find images of interest. Many users would like to change the names of the images to make the names more meaningful to both the owner of the images as well as for users invited to view the image collection. However, current photosharing sites require too much user time and effort to rename and organize images that have been added to the site.

As photo-sharing sites become more popular, users will want to place their entire image collection on the server. However, users will not want to upload hundreds or thousands of files and manually name and organize the images on the photosharing site. This would be a tedious and time-consuming process that most users will want to avoid, which negatively impacts the rate of adoption of photosharing sites.

Accordingly, what is needed is an improved method and system for naming digital images, particular those that are uploaded images to a photosharing site. The present invention addresses such a need.

SUMMARY OF THE INVENTION

The present invention provides a method and system for automatically generating names for files uploaded from a computer to a server. Aspects of the present invention include allowing a user to define a file-naming template using information available from a variety of sources including, the uploaded files, an application environment of the server, and an operating environment of the computer. Names are then automatically generated for each file when files are uploaded based on the template pattern.

According to the method and system disclosed herein, the user is alleviated from having to manually change the name of the files when uploading the files to a photosharing site, thereby making the upload process more user-friendly.

DESCRIPTION OF THE INVENTION

The present invention relates to uploading images from a computer to a server for storage where names of the files are automatically generated for the images based on certain attributes. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown, but is to be accorded the widest scope consistent with the principles and features described herein.

The present invention provides an automatic method and system for naming and organizing digital files that are uploaded to a server based on attributes of the files specified by the user.

Figure 1:
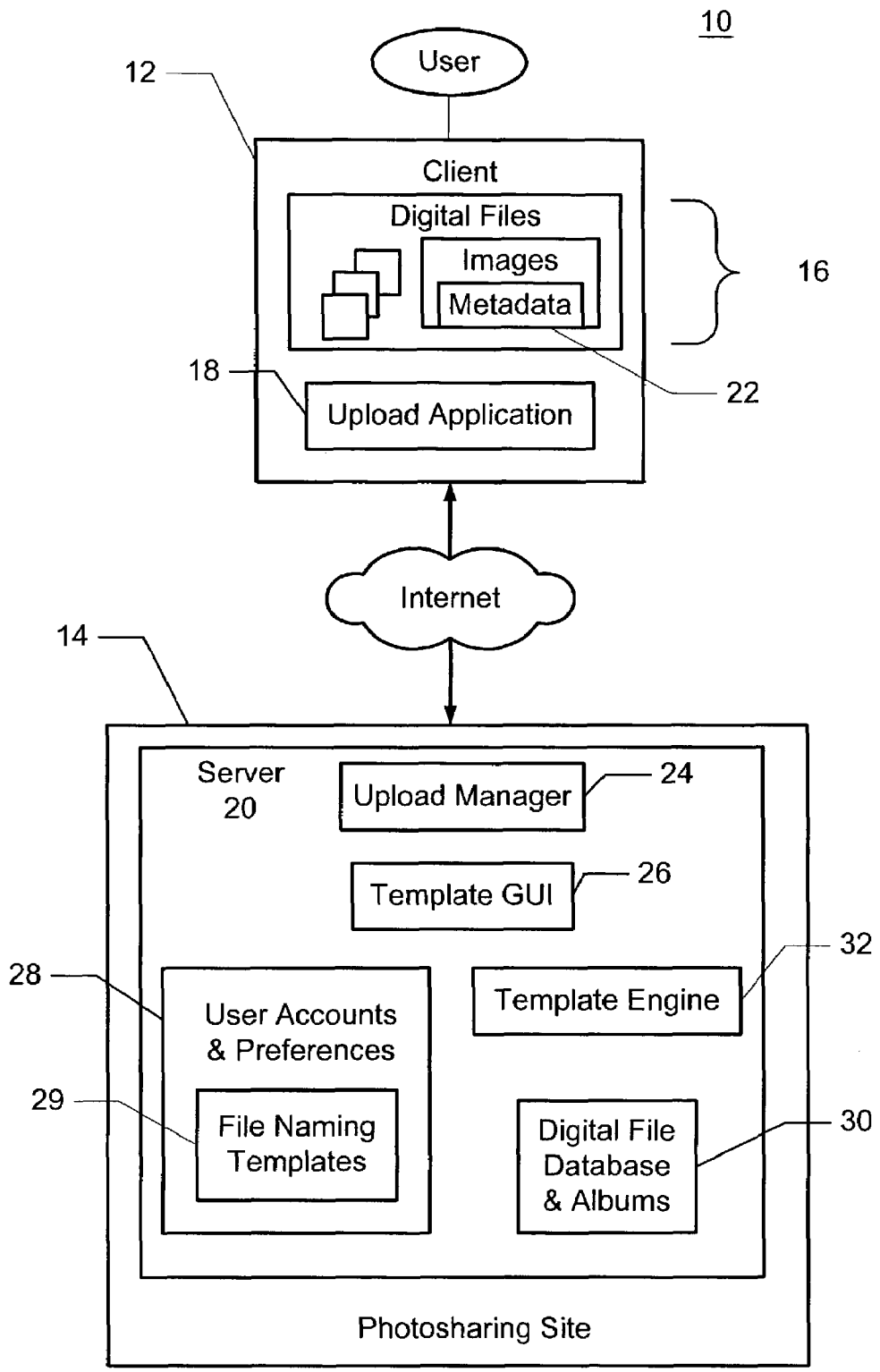
FIG. 1 is a block diagram illustrating an online photo-sharing system that automatically stores and organizes digital files in accordance with a preferred embodiment of the present invention.

FIG. 1 is a block diagram illustrating an online photo-sharing system 10 that automatically stores and organizes digital files in accordance with a preferred embodiment of the present invention. The system 10 includes one or more computers 12 that access a photosharing site 14 over a network, such as the Internet. Once connected to the Internet, the computer 12 has the capability of uploading digital files 16 to the photosharing site 14 for storage and display.

A computer 12 refers to an electronic device capable of storing digital files and communicating over a network 18, such as PCs. In a preferred embodiment, the computers 12 are browser-based, although non-browser-based computers 12 may also be used. Whether browser-based or not, the computer 12 may be supported by a specialized upload application 18 that operates in accordance with present invention for uploading images. The computer 12 may also refer to any electronic device capable of storing digital images and/or video, such as photo kiosks, web-enabled digital cameras, PDAs, and cellphones, for example.

In a preferred embodiment, the type of digital files 16 that are uploaded to the site are predominately digital images, but also include video clips, and audio. The digital files 16 may be input into the computer 12 from a variety of sources (not shown), such as a digital camera, CD, DVD, or a scanner, for instance. The files 16 may be stored on a storage device (not shown), such as a hard drive, CDR, DVDR, or an imaging device attached to the computer. As is well-known in the art, files in the computer 12 are stored in a folder hierarchy. Note, each folder in the folder hierarchy may store subfolders and files, and subfolders may also be referred to as folders. The route to each file 16 stored in the folder hierarchy is known as a file path.

In a preferred embodiment, some or all of the digital files 16, particularly images, have metadata 22 associated with them that describes and/or categorizes the file 16. The metadata 22 may be included within the files 16, or be stored in a separate file 16. The Exchangeable Image File Format for Digital Still Camera (EXIF) is an example of an international digital still camera image file format standard that supports attachment of tags to image files. Other types of digital files 16 may also include metadata 22, such as HTML and XML documents, for example.

The photosharing site 14 comprises at least one server 20 that includes a web server/upload manager 24, a template GUI 26, a user accounts and preferences database 28, a digital file and album database 30, and a template engine 32. The web server/upload manager 24 accepts connections from the computer 12 and receives uploaded files 16. The web server/upload manager 24 also handles interactions from web browsers (not shown) for setting user preferences and requests to view albums.

Figure 2:
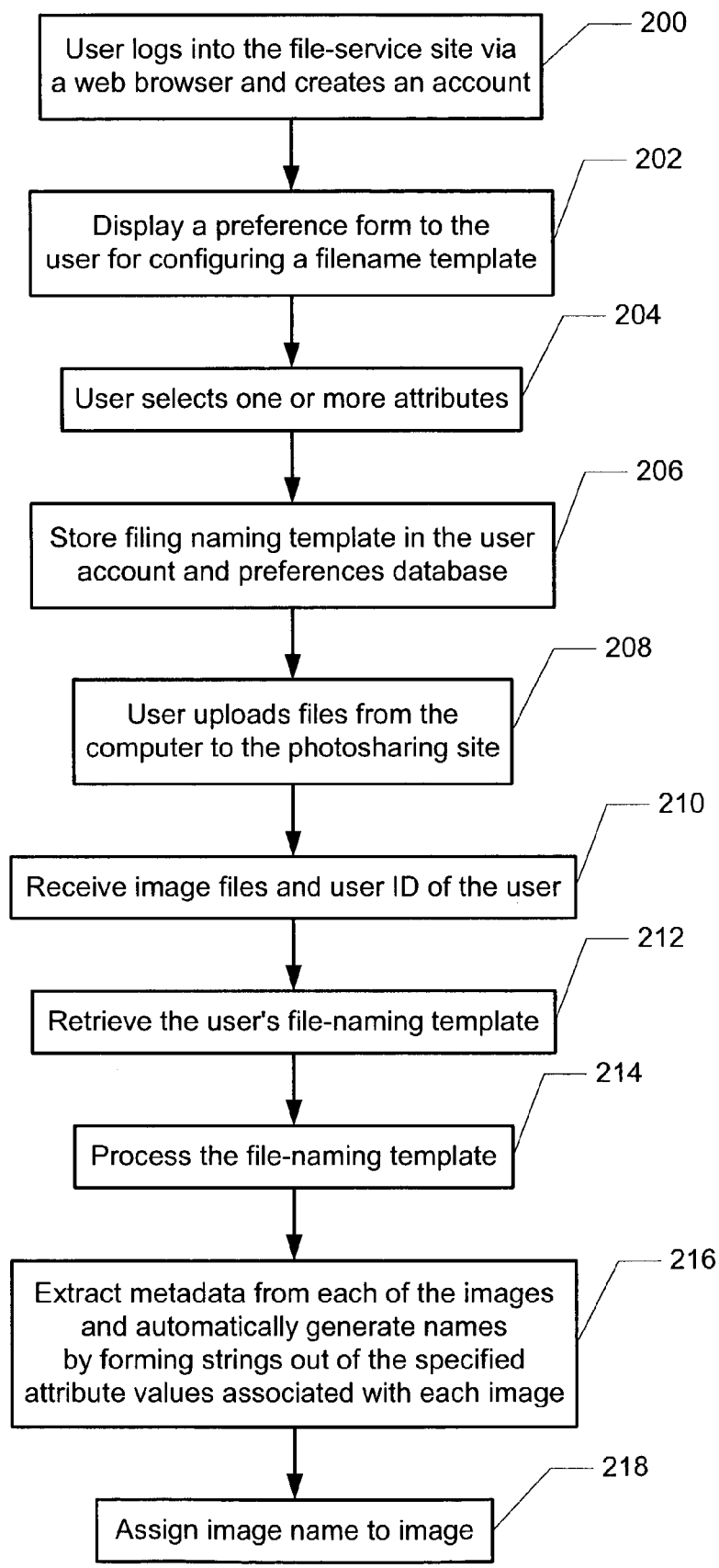
FIG. 2 is a flow diagram of the process for automatically generating names for the image files uploaded to the photosharing site in accordance with a preferred embodiment of the present invention.

FIG. 2 is a flow diagram of the process for automatically generating names for the files uploaded to the photosharing site 14 in accordance with a preferred embodiment of the present invention. The process begins in step 200 when a user logs into the photosharing site 14 via a web browser and creates an account. All the user's account information, including user ID, is stored in the user account and preferences database 28.

Once the user has become a member of the photosharing site 14, the template GUI 26 displays a series of preference forms in step 202 to the user for configuring a file-naming template 29. In a preferred embodiment, the configuration forms display a series of attributes that are associated with the files 16 (hereinafter referred to as images) for combination into a pattern that defines the file-naming template. In an alternative embodiment, the user may enter the attributes directly without a GUI.

According to the present invention, the attributes are used to generate image names include information available from the uploaded image 16, the application environment of the photosharing site 14, and the operating environment of the client computer 12. The information available from the uploaded image 16 includes the image metadata 22 (e.g., camera make, date, image height, etc.). Information available from the application environment of the photosharing site 14 may include the user's account data (e.g., username, and user's personal info (address, firstname, lastname, etc.)). Information available from the operating environment of the upload computer 12 may include the OS type, version, image name, filepath, and so on.

Figure 3:
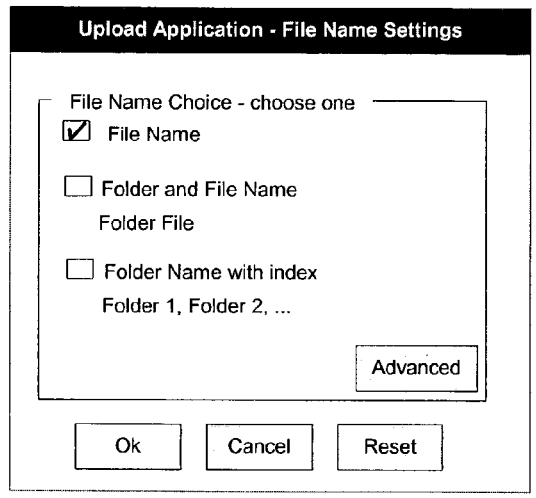
FIGS. 3 and 4A–4B are diagrams illustrating example template preference forms.
Figure 4A:
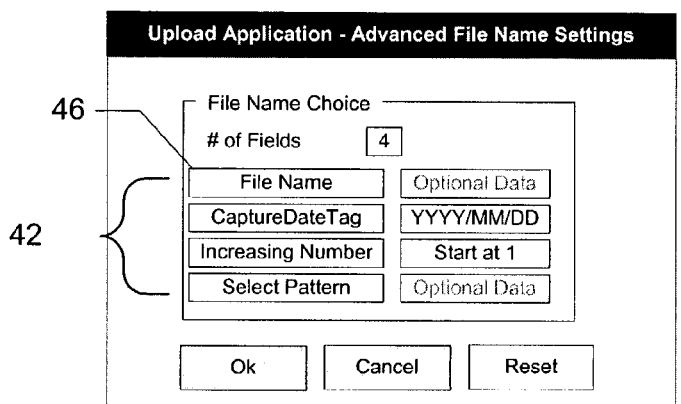
Figure 4B:
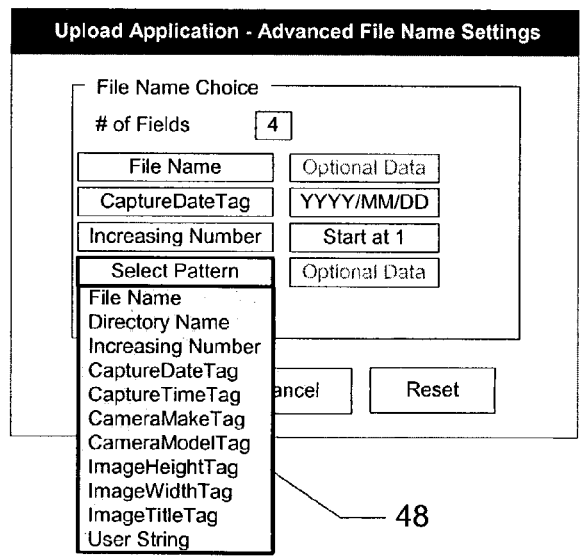

FIGS. 3 and 4A–4B are diagrams illustrating example template preference forms. In a preferred embodiment, the user may be presented with a group of simple attribute combinations for defining the file-naming template. FIG. 3 shows three common combinations of information that can be used to form image names; the existing filename only (e.g., "ParadeShot"), the original folder name in combination with the filename (e.g., "My Pictures" and "ParadeShot"), or the original folder name with an index (e.g., "My Pictures–1" "My Pictures–2" . . . ).

If the user clicks the advanced button on the first preference form, an advanced image name settings form is displayed, as shown in FIG. 4A. The advanced image name settings form gives the user the opportunity to create a custom pattern of attributes that will be used for generating the name. The user first selects a number of attributes fields that will be used to generate the image name. Based on the number entered, the corresponding number of attributes fields 42 are displayed as a series of pull down menu choices 48 listings the attributes available for selection, as shown in FIG. 4B.

The list of available attributes may include:

| | |
|---|---|
| File Name = | name of the image on the upload computer |
| Directory Name = | directory of origin or the path of the image on the upload computer |
| Increasing Number = | produces a unique integer on each use |
| CaptureDateTag = | date of image capture from the image metadata |
| CatureTimeTag = | time of image capture from the image metadata |
| CameraMakeTag = | make of the camera that took the picture from the image metadata |
| CameraModelTag = | model of the camera that took the picture from the image metadata |
| ImageHeightTag = | height in pixels of the image from the image metadata |
| ImageWidthTag = | width in pixels of the image from the image metadata |
| User String = | user supplied value |
| Upload Date = | date/time of the image upload |
| OS type = | type of the OS on the upload computer |
| System Time = | uses the system time to produce unique value |
| GPS = | GPS data taken at the time of image capture |
| Last Name = | lastname of the user from the user account database |

By selecting various attribute fields 42, the user specifies the pattern that will be used to generate the image name. Some examples of patterns that can be selected include:
  Directory name with an increasing numeric, and OS type
  User specified name with an increasing numeric,
  Value of a specified metadata tag,
  Value of a set of metadata tags concatenated together, and
  Any combination of directory name, user specified name, specified metadata tag value, and/or increasing numeric.

In the example shown in FIGS. 4A and 4B, for instance, the user has selected the attributes "File Name," "CaptureDate Tag," "Increasing Number," and "Select Pattern" as the four attributes that will be used to form the image name. Depending on the type of attributes selected, the file name settings form displays an optional field that allows the user to enter additional data. For example, next to the "CaptureDate Tag", the optional field allows the user to select the format for the year, month, and date. The attribute "Increasing Number" appends a sequential number to each uploaded image and the optional field allows the user to specify the starting number. The "User String" is an attribute that allows the user type-in a desired text string in the optional field.

Referring again to FIG. 2, in step 204, the user selects one or more of the displayed attributes to complete the form. In an alternative embodiment, rather than drop down menus, the form could display all the available attributes fields with corresponding check boxes for user selection. In step 206, the file-naming template 29 is stored in the user account and preferences database 28.

Anytime thereafter, the user may upload files from the computer 12 to the photosharing site 14 in step 208. The attributes describing the operating environment of the computer 12 may also be uploaded at this time. In step 210, the web server/upload manager 24 receives the files 16 and the user ID of the user. In step 212, the user ID is used to retrieve the user's file-naming template 29.

In step 214, the template engine 32 processes the file-naming template 29. When the template 29 is processed in step 216, the metadata 22 is extracted from each of the images 16 and names are automatically generated for the image 16 by forming a string out of the values corresponding to the attributes specified in the template 29 that are associated with the image 16. The string is then assigned the image 16 as the new image name in step 218, and the server 20 subsequently uses the generated name to access the image 16. In a preferred embodiment, the generated name assigned to the image 16 does not affect the file name of the image 16 on the source computer 12.

As an example of an automatically generated name, assume that the file-naming template 29 specified the string as "FileName-LastName-CameraMake." Assume further that the file name of the uploaded image is "kidsatplay.jpg," the last name of the user who uploaded the image is "Smith", and that the metadata in the image indicates the camera maker is "Kodak". The values for the attributes defined in the string would be used to assign the name "kidsatplay-Smith-Kodak".

As another example, assume that the user has selected the option to have the template form storage location names, such as for the online album that the uploaded images will be be added to, and that the template specifies the name string as "Camera Make:Camera Model." This would cause an uploaded image taken by a Kodak DC290 camera to be stored in an album named "Kodak:DC290". If the album does not already exist, it can optionally be created.

A method for automatically generating and assigning image names to upload images has been disclosed. The present invention has been described in accordance with the embodiments shown, and one of ordinary skill in the art will readily recognize that there could be variations to the embodiments, and any variations would be within the spirit and scope of the present invention. For example, the functionality for configuring templates 29 and using the templates 29 to generate image names could be implemented in the upload application 18 rather than on the server 20. Accordingly, many modifications may be made by one of ordinary skill in the art without departing from the spirit and scope of the appended claims.

What is claimed is:

1. A method for automatically generating file names, the method comprising:
    presenting a user with multiple file naming options, wherein the file naming options are based, at least in part, upon file attributes;
    allowing the user to select one or more of the file naming options from the file naming options presented;
    creating a file naming template based at least in part on the file naming options selected by the user; and
    automatically naming one or more files based at least in part on the file naming template.

2. The method of claim 1, wherein the file attributes comprise file metadata.

3. The method of claim 2, wherein the file attributes further comprise information available from an operating environment of a computer on which the one or more files reside.

4. The method of claim 3, wherein the information available from the operating environment of the computer on which the one or more files reside further comprises one or more of: the computer operating system type, file name, and file path.

5. The method of claim 4, wherein the file naming options are based at least in part upon information about the user stored on the computer.

6. The method of claim 5, wherein automatically naming one or more files based at least in part on the file naming template further comprises forming a file name string from values associated with the one or more files which correspond to the attributes specified in the file naming template and assigning the file name string as the filename.

7. The method of claim 6, further comprising storing the file naming template as part of the user's preferences.

8. The method of claim 1, further comprising:
    allowing the user to select on or more files residing on a computer, thus providing selected files; and
    transferring the selected files from the computer to a server,
    wherein automatically naming one or more files includes automatically generating a corresponding name for each of the selected files based at least in part on the file naming template and assigning the corresponding name to each of the selected files for storage on the server.

9. The method of claim 8, wherein the file attributes comprise information available from one or more of the transferred files, an operating environment of the computer, and an application environment of server.

10. The method of claim 9, wherein the information available from the application environment of the server includes user account data stored on the server.

11. The method of claim 10, further comprising storing the file naming template as part of the user's preferences of the server and retrieving the file naming template from the user's preferences upon transfer of files to the server for use in naming the transferred files.

12. The method of claim 11, further comprising uploading attributes of the computer operating environment along with the selected files.

13. A method for automatically generating file names, the method comprising:
    presenting a user with multiple file naming options, wherein the file naming options are based, at least in part, upon file attributes;
    receiving user input selecting one or more of the file naming options from the file naming options presented;
    creating a file naming template based at least in part on the file naming options selected by the user;
    storing the file naming template on a server;
    receiving one or more files uploaded to the server, each uploaded file having been previously named with a corresponding first name; and
    automatically generating a corresponding second name for each uploaded file based at least in part on the file naming template and assigning the corresponding second name to each uploaded file for storage on the server.

14. A computer program product, tangibly stored on a computer-readable medium, comprising instructions operable to cause a programmable processor to:
    present a user with multiple file naming options, wherein the file naming options are based, at least in part, upon file attributes;
    allow the user to select one or more of the file naming options from the file naming options presented;
    create a file naming template based at least in part on the file naming options selected by the user; and
    automatically name one or more files based at least in part on the file naming template.

15. The product of claim 14, wherein the file attributes comprise file metadata.

16. The product of claim 15, wherein the file attributes further comprise information available from an operating environment of a computer on which the one or more files reside.

17. The product of claim 16, wherein the information available from the operating environment of the computer on which the one or more files reside further comprises one or more of: the computer operating system type, file name, and file path.

18. The product of claim 17, wherein the file naming options are based at least in part upon information about the user stored on the computer.

19. The product of claim 18, wherein the instructions to automatically name one or more files based at least in part on the file naming template further comprises instructions to form a file name string from values associated with the one or more files which correspond to the attributes specified in the file naming template and assign the file name string as the filename.

20. The product of claim 19, further comprising instructions to store the file naming template as part of the user's preferences.

21. The product of claim 14, further comprising instructions to cause a programmable processor to:
   allow the user to select one or more files residing on a computer, thus providing selected files; and
   transfer the selected files from the computer to a server, wherein the instructions to automatically name one or more files include instructions to automatically generate a corresponding name for each of the selected files based at least in part on the file naming template and assign the corresponding name to each of the selected files for storage on the server.

22. The product of claim 21, wherein the file attributes comprise information available from one or more of the transferred files, an operating environment of the computer, and an application environment of the server.

23. The product of claim 22, wherein the information available from the application environment of the server includes user account data stored on the server.

24. The product of claim 23, further comprising instructions to cause a programmable processor to store the file naming template as part of the user's preferences on the server and retrieve the file naming template from the user's preferences upon transfer of files to the server for use in naming the transferred files.

25. The product of claim 24, further comprising instructions operable to cause a programmable processor to upload attributes of the computer operating environment along with the selected files.

26. A computer program product, tangibly stored on a computer-readable medium, comprising instructions operable to cause a programmable processor to:
   present a user with multiple file naming options, wherein the file naming options are based, at least in part, upon file attributes;
   receive user input selecting one or more of the file naming options from the file naming options presented;
   create a file naming template based at least in part on the file naming options selected by the user;
   store the file naming template on a server;
   receive one or nore files uploaded to the server, each uploaded file having been previously named with a corresponding first name; and
   automatically generate a corresponding second name for each uploaded file based at least in part on the file naming template and assign the corresponding second name to each uploaded file for storage on the server.

* * * * *

UNITED STATES PATENT AND TRADEMARK OFFICE
CERTIFICATE OF CORRECTION

PATENT NO. : 7,039,873 B2  
APPLICATION NO. : 10/436561  
DATED : May 2, 2006  
INVENTOR(S) : Robert P. Morris and Patricia Scardino It is certified that error appears in the above-identified patent and that said Letters Patent is hereby corrected as shown below:

Column 6, claim 8, line 2

Change "...allowing the user to select on or more files residing on a..."

to "...allowing the user to select one or more files residing on a..."

Column 6, claim 11, line 19

Change
"...the file naming template as part of the user's preferences of..."
to
"...the file naming template as part of the user's preferences on..."

Signed and Sealed this

Eighth Day of August, 2006

JON W. DUDAS  
*Director of the United States Patent and Trademark Office*